US009505875B2

(12) United States Patent
Burton

(10) Patent No.: US 9,505,875 B2
(45) Date of Patent: Nov. 29, 2016

(54) ACCELERATORS FOR POLYMERIZATION OF EPOXY RESINS

(71) Applicant: HUNTSMAN PETROCHEMICAL CORPORATION, The Woodlands, TX (US)

(72) Inventor: Bruce L. Burton, Spring, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 441 days.

(21) Appl. No.: 13/688,830

(22) Filed: Nov. 29, 2012

(65) Prior Publication Data

US 2013/0090450 A1   Apr. 11, 2013

Related U.S. Application Data

(63) Continuation of application No. 12/528,127, filed as application No. PCT/US2008/054646 on Feb. 22, 2008, now abandoned.

(60) Provisional application No. 60/902,787, filed on Feb. 22, 2007.

(51) Int. Cl.
| | |
|---|---|
| *C08G 59/40* | (2006.01) |
| *C08G 59/56* | (2006.01) |
| *C08G 59/68* | (2006.01) |
| *C08L 63/00* | (2006.01) |

(52) U.S. Cl.
CPC ............. *C08G 59/56* (2013.01); *C08G 59/686* (2013.01); *C08L 63/00* (2013.01)

(58) Field of Classification Search
CPC ...... C08G 59/56; C08G 59/686; C08L 63/00
USPC ..................... 528/405; 252/182.26
See application file for complete search history.

(56) References Cited

U.S. PATENT DOCUMENTS

| | | | |
|---|---|---|---|
| 4,195,153 | A | 3/1980 | Waddill |
| 4,495,081 | A | 1/1985 | Vanderhider et al. |
| 4,521,572 | A | 6/1985 | Cuscurida et al. |
| 4,724,253 | A | 2/1988 | Cavitt et al. |
| 4,818,801 | A | 4/1989 | Rice et al. |
| 5,243,014 | A | 9/1993 | Shomer |
| 5,439,977 | A | 8/1995 | Yokota et al. |
| 7,504,460 | B2 | 3/2009 | Basheer et al. |

FOREIGN PATENT DOCUMENTS

| | | |
|---|---|---|
| EP | 1700875 A | 9/2006 |
| JP | 59232118 | 12/1984 |
| JP | 6363716 | 3/1988 |
| JP | 63165429 | 7/1988 |
| JP | 6337408 | 12/1994 |

OTHER PUBLICATIONS

Jeffamine D-203, Technical Bulletin, Huntsman, 1988.*

* cited by examiner

*Primary Examiner* — Shane Fang
(74) *Attorney, Agent, or Firm* — Patterson & Sheridan LLP

(57) ABSTRACT

Accelerator compositions useful in the curing of epoxy resins having at least one amine and a glycerin and methods for making the accelerator compositions are provided.

20 Claims, 3 Drawing Sheets

ACCELERATORS FOR POLYMERIZATION OF EPOXY RESINS

CROSS-REFERENCE TO RELATED APPLICATIONS

This application is a continuation of U.S. patent application Ser. No. 12/528,127, filed Aug. 21, 2009, which is the national stage entry of international Application Serial No. PCT/US2008/054646, filed Feb. 22, 2008, which claims the benefit of U.S. Provisional Patent Application Ser. No. 60/902,787, filed Feb. 22, 2007. The above-referenced patent applications are herein incorporated by reference in their entirety.

BACKGROUND OF THE INVENTION

Field of the Invention

The present invention relates generally to epoxy resins and more particularly to accelerator compositions used in the curing of epoxy resins.

Background of the Invention

N-aminoethylpiperazine ("AEP") is widely used in conjunction with polyetheramines, e.g. JEFFAMINE® D-230 amine and JEFFAMINE® T-403 amine, to serve as an accelerator for increasing the polymerization rate of epoxy resins cured with such hardeners (JEFFAMINE is a registered mark of the Huntsman Corporation of The Woodlands, Tex.). AEP has provided some of the highest exotherm temperatures seen when used to cure epoxy resins. Providing high exotherm temperatures can be advantageous to promote increased curing but can lead to polymer degradation if unchecked. Therefore, the amount of AEP used in such a reaction needs to be closely monitored. Because the equivalent weights of AEP typically differ from those of the other epoxy hardeners (such as amine based hardeners) used for epoxy resin curing, calculations must typically be done each time a different accelerator level is used (of reactive amine containing accelerators) to adjust the reactivity of the epoxy formulation. For many users, this is cumbersome and can lead to errors.

Other accelerators of amine cured epoxy blends exist, but they each have particular drawbacks that can make them unsuitable for certain applications. For instance, phenolic accelerators are often solids and contribute undesired color or ultraviolet light sensitivity to the final formulation. Widely used liquid accelerators, e.g. nonyl phenol, mono-nonyl phenol (MNP), dinonyl phenol etc., also serve as plasticizers, significantly and sometimes undesirably decreasing the glass transition temperature ($T_g$) of resin systems into which they are incorporated at levels high enough to provide significant acceleration. Additionally, the accelerating effect diminishes as increasing levels of MNP are used since the reactant group concentrations (amine and epoxide) are diminishing.

Tertiary amines such as ethanolamine derivatives that contain high levels of hydroxyl groups, such as triethanolamine, methyldiethanolamine, dimethylethanolamine, etc., have been effectively used as accelerators but since they remain as small molecules that do not react into the polymer network, they too are known to cause significant decreases in $T_g$. In addition, several such ethanolamine derivatives are now regulated by governmental authorities due to their potential use as chemical weapons precursors.

BRIEF SUMMARY OF SOME OF THE PREFERRED EMBODIMENTS

Embodiments of the present invention disclose an accelerator composition having an at least one amine and a glycerin.

In another embodiment, a method is disclosed for making an accelerator composition. The method provides at least one amine and a glycerin and contacts the two.

In another embodiment, this invention also concerns a method for making an epoxy resin. The method provides at least one amine, a glycerin, an epoxy hardener, and a polyepoxy. The method contacts the epoxy hardener and polyepoxy in the presence of an accelerator composition that comprises the at least one amine and the glycerin to form an epoxy resin.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other compositions and methods for carrying out the same purposes of the present invention. It should also be realized by those skilled in the art that such equivalent compositions and methods do not depart from the spirit and scope of the invention as set forth in the appended claims.

DETAILED DESCRIPTION OF THE PREFERRED EMBODIMENTS

Figure 1:
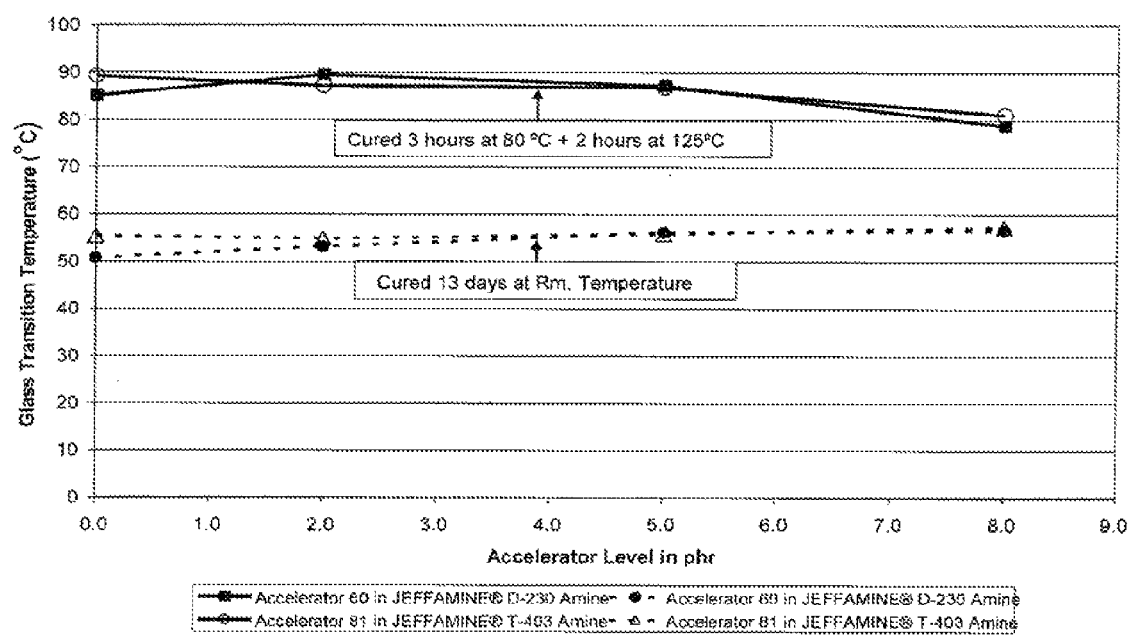
FIG. 1 displays the effect of accelerator composition level on $T_g$.

Embodiments of the present invention disclose an accelerator composition having an at least one amine and a glycerin. The at least one amine may comprise AEP. AEP is a somewhat unusual amine in that it contains a primary, a secondary, and a tertiary amine. However, a wide variety of other amines can be used in the accelerator compositions of this invention. Combinations of two or more amines can be used. Examples of other suitable amines includes amines having any combination of primary, secondary, and tertiary amines such that there are at least two active hydrogen atoms attached to an amine group in each molecule, and combinations of such amines. Suitable amines may include amines having a primary amine group; amines having a secondary amine group; amines having a tertiary amine group; amines having a primary and secondary amine group; amines having a primary and tertiary amine group; amines having a secondary and tertiary amine group; amines having a primary, secondary and tertiary amine group. Amine compounds having only one active hydrogen atom serve as polymer chain terminators which typically decrease $T_g$ and deteriorate mechanical properties at temperatures below the $T_g$ of the cured resin, thus such amines should typically be avoided, although their presence in small quantities may not be sufficient to cause problems. Amine compounds having no active hydrogen groups, i.e. amines that contain only tertiary amine groups, may provide some acceleration, but do not significantly react into the polymer network and will therefore serve as plasticizers, decreasing the $T_g$ of the cured epoxy resin. For this reason, compounds containing only tertiary amines may be allowable at levels that accelerate curing but do not deteriorate the performance of the final polymer.

In an embodiment, the at least one amine includes a piperazine such as N-aminobutylpiperazine, 1,4-bis-(3-aminopropyl) piperazine, and combinations thereof. In another embodiment, the at least one amine includes a diamine such as isophorone diamine, norbonanediamine, m-xylene diamine, menthanediamine, ethylenediamine, and combinations thereof. In one embodiment, the at least one amine is bis(p-aminocyclohexyl)methane, bis(4-amino,3-methylcyclohexyl)methane, diaminocyclohexane (commercially available as ARADUR® 2954 amine or LAROMIN® C-260 amine (ARADUR is a registered mark of Huntsman Corporation of The Woodlands, Tex.; and LAROMIN is a registered mark of the BASF Aktiengesellschaft Corporation of Ludwigshafen, Germany), 1,3-bis(aminomethyl)cyclohexylamine, and combinations thereof. In another embodiment, the at least one amine is diethylenetriamine, triethylenetetramine, aminopropylmorpholine, aminoethylethanolamine, and combinations thereof. In one embodiment, the at least one amine is an ethyleneamine, an ethanolamine, and combinations thereof. In general, the amine molecules of the accelerator compositions typically have from 1 to 50 carbons. One skilled in the art, with the benefit of this disclosure, will recognize appropriate amines for use in embodiments of the present invention.

The accelerator composition includes a glycerin. Glycerin is a material of low toxicity with the chemical formula of $HOCH_2CH(OH)CH_2OH$. Different grades or purities of glycerin may be used in embodiments of the present invention. Glycerin has the advantage of being liquid at room temperature and typically easily miscible with amines, allowing for easier preparation of the accelerator compositions. One skilled in the art, with the benefit of this disclosure, will recognize appropriate glycerins to use in embodiments of the present invention.

The combination of the at least one amine (e.g., AEP) and glycerin possess both highly reactive amine functionality and tertiary amine groups (in the AEP) and a significant number of hydroxyl groups (in the glycerin) each of which serve to promote the polymerization of epoxy resins with amine hardeners.

In embodiments of this invention, the pairing of glycerin and amines (including amine blends) can provide a user with control over the final $T_g$ of the epoxy resin. In one embodiment, the accelerator composition will provide a user with a $T_g$ temperature higher than those achievable from reacting the polyepoxy with the epoxy hardener alone. In combination with other accelerators, accelerator compositions of the present invention may be used to minimize the $T_g$ loss typically seen when other accelerators are used. This may have the added benefit of allowing a user to increase amounts of accelerator composition used without compromising the final $T_g$ of the epoxy resin. Pairing glycerin with amines exhibiting lower glass transition temperatures can also be advantageous for users desiring to increase flexibility (lower $T_g$) in the epoxy resin. One skilled in the art, with the benefit of this disclosure, will recognize appropriate glycerin and amine combinations to use in order to accelerate an epoxy formulation while either maintaining a desired $T_g$, or modifying it to achieve a desired $T_g$.

In an embodiment of the present invention, the accelerator composition has an amine hydrogen equivalent weight (AHEW) that is similar to the AHEW of the epoxy hardener. The AHEW of a molecule may be calculated by dividing its molecular weight by the number of hydrogen atoms that are attached to amino nitrogen atoms in the molecule. As an example, for AEP the AHEW is determined by dividing the molecular weight of AEP (129.2) by three to give an AHEW of 43.07. The AHEW of a blend of two or more components may be calculated by taking the reciprocal of the sum of the weight fraction of each amine divided by that amine's AHEW. Similarly, instead of using weight fractions, the AHEW of the blend is 100 divided by the sum of the weight percentage of each amine in the blend, divided by that amine's AHEW. For non-reactive components such as glycerin, the AHEW may be thought of as infinite thus the percentage terms for non-reactive components become zero and need not be included. As an example, using weight fractions, the AHEW of a blend of ⅓ Amine A (AHEW=40), ⅓ Amine B (AHEW=60), and ⅓ non-reactive hydroxyl containing compound, with no amine hydrogen groups is: 1 divided by ((⅓)40+(⅓)60+0) which equals 72. In the case of epoxy hardeners that are polyamide hardeners, the hydrogen atoms attached to the nitrogen atom of the amide group are not included, since they are generally unreactive with epoxide groups.

Amines used in embodiments of the present invention can widely vary in AHEW since it is the AHEW of the final accelerator composition that is important to the performance of the invention. For example, ethylene diamine has a calculated AHEW of about 15 whereas aminopropylmorpholine has an AHEW of about 72. If one desired to produce an accelerator composition having an AHEW greater than 72, glycerin could be added to either amine, but the amine having the lower AHEW would require a higher proportion of glycerin. If an accelerator composition having an AHEW of 60 were desired, an amine or blend of amines could be used as long as their AHEW was no greater than 60, thus glycerin could be added to adjust the AHEW upward until the desired AHEW, matching that of the main epoxy hardener, was reached. Note that in this second instance, aminopropylmorpholine, by itself (with an AHEW of 72), would not be suitable since its AHEW is higher than the target AHEW of the accelerator composition.

In embodiments of the present invention, the AHEW of the accelerator composition may be chosen so that the AHEW of the accelerator composition matches the AHEW of the epoxy hardener to be used to make the epoxy resin. In this way, no calculation by the end user is necessary, but the accelerator may simply be exchanged, at low use levels, on a weight for weight basis with the epoxy hardener being used to form the epoxy resin. This greatly simplifies the use of accelerator compositions because it eliminates the necessity for calculations each time a new accelerator level is needed for reactivity adjustment.

In embodiments of the present invention, the accelerator composition has an AHEW range of from about 10 to about 300. In some embodiments, the accelerator composition has an AHEW in the range of from about 55 to about 65; or from about 75 to about 90; or from about 140 to about 160. In some embodiments, the accelerator composition has an AHEW of about 60 or about 81. One skilled in the art, with the benefit of this disclosure, will recognize appropriate AHEWs for use in this invention.

Embodiments of the present invention disclose a method for making an accelerator composition that includes the steps of providing at least one amine and a glycerin; and contacting the at least one amine and a glycerin. The at least one amine may be chosen depending on the desired AHEW of the final accelerator composition.

Embodiments of the present invention also disclose a method for making an epoxy resin. The method provides at least one amine, a glycerin, an epoxy hardener, and a polyepoxy. The epoxy hardener may be an amine hardener such as polyamine, like diamine, or a polyamine blend. The epoxy hardeners of the present invention may have AHEWs in the range of 10 to about 300. In particular embodiments, the epoxy hardener has an AHEW in the range of from about 55 to about 65; or from about 75 to about 90; or from about 140 to about 160. In some embodiments, the epoxy hardener has an AHEW of about 60 or about 81. Two commercial examples of epoxy hardeners are JEFFAMINE® D-230 amine (AHEW=60) and JEFFAMINE® T-403 amine (AHEW=81). JEFFAMINE® D-230 amine is a diprimary polyetheramine of approximately 230 molecular weight. JEFFAMINE® T-403 amine is a triprimary polyetheramine of approximately 403 molecular weight. Both amines are available from the Huntsman Corporation of The Woodlands, Tex. In embodiments of the present invention, the AHEW of the epoxy hardener may be chosen to match the AHEW value of the accelerator composition. One skilled in the art will recognize other appropriate epoxy hardeners for use in this invention.

The methods of the present invention also provide a polyepoxy. The polyepoxy used in this invention, as one's structure is displayed below, are well known in the art. One skilled in the art, with the benefit of this disclosure, will recognize appropriate polyepoxies for use in this invention.

The method contacts the polyamine and polyepoxy in the presence of an accelerator composition that comprises at least one amine and a glycerin to make the epoxy resin.

The curing (polymerization) of polyepoxy with epoxy hardeners is well-known in the art. The resultant cross-linked polymer networks are formed, for example, from the reaction between a polyepoxy such as:

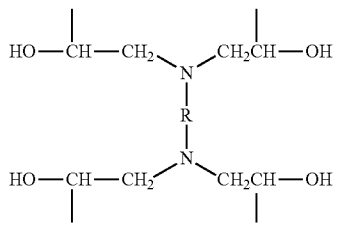

These are well-known in the art, and are the reaction products of various polyepoxy containing compounds and various polyamines and polymers produced from the combination thereof. The accelerator composition of this invention is used concurrently in the polymerization reaction of the epoxy hardener, including blends, (e.g., polyether polyamines and ethyleneamine derivatives) and polyepoxide. The methods of the present invention may be conducted at a wide range of temperatures such as from near freezing to greater than 150 degrees Celsius (° C.).

The accelerator compositions used in methods disclosed herein may be chosen to match the AHEW of the epoxy hardener. In these embodiments, the independent AHEW values of each of the accelerator composition and the epoxy hardener would be roughly equivalent. For example, an accelerator composition of AHEW=60 may be used when using JEFFAMINE® D-230 amine (AHEW=60) as the epoxy hardener. In such embodiments, the accelerator compositions can be substituted for JEFFAMINE® D-230 amine on an equal weight basis for the reaction to form the epoxy resin. In some embodiments of the present invention, the AHEW of the accelerator composition and the AHEW of the epoxy hardener may be about the same value in the range of from about 10 to about 300. In embodiments, the AHEW of the accelerator composition and the AHEW of the epoxy hardener are in the range of from about 55 to about 65; or from about 75 to about 90; or from about 140 to about 160. In an embodiment, the AHEW of the accelerator composition and the AHEW of the epoxy hardener may be about 60. In an embodiment, the AHEW of the accelerator composition and the AHEW of the epoxy hardener may be about 81. One skilled in the art will recognize other appropriate AHEW values for each of the accelerator composition and the epoxy hardener for use in this invention.

The accelerator compositions and epoxy hardeners used in methods disclosed herein may be chosen to form an epoxy

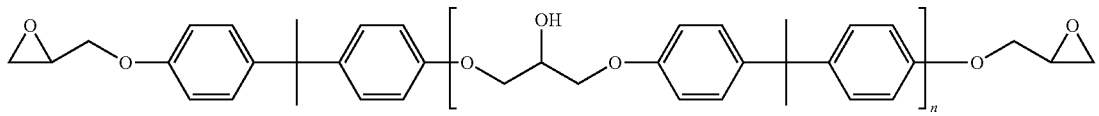

wherein n is from 0 to 10, and an epoxy hardener, for example, a polyamine or polyamine blend, which may be a diamine of formula:

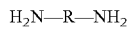

or a blend of such an amine with other amines wherein R can be a hydrocarbon group having 1 to 50 carbons or a polyether group of from 1 to 50 carbons, among other groups, to produce cross-linked polymers with segments similar to:

resin with a desired $T_g$. For example, if a lower $T_g$ is desired to increase the flexibility of the system, an amine or blend of amines yielding a lower $T_g$ when used to cure the epoxy may be used. If a higher $T_g$ is desired, an amine with a higher $T_g$, such as AEP, may be used. The glycerin typically lowers the $T_g$ level and therefore can be used in appropriate amounts to adjust the final $T_g$ of the epoxy resin. The amount of accelerator composition used (compared with epoxy hardener) may also be used to affect the $T_g$. One skilled in the art, with the benefit of this disclosure, will recognize appropriate amounts and types of accelerator compositions and epoxy hardeners to create an epoxy resin with a desired $T_g$.

The following examples are exemplary and not intended to limit the scope of the invention or claims hereto.

EXAMPLES

Example 1

An accelerator composition having an AHEW=60 was prepared by mixing 71.78 grams (g) of N-aminoethylpiperazine and 28.22 g of glycerin.

Example 2

An accelerator composition having an AHEW=60 was prepared by mixing 44.93 g of aminoethylethanolamine, 26.85 g of aminopropyl morpholine and 28.22 g of glycerin.

Example 3

An accelerator composition having an AHEW=81 was prepared by mixing 53.17 g of N-aminoethylpiperazine and 46.83 g of glycerin.

Example 4

An accelerator composition having an AHEW=81 was prepared by mixing 33.28 g of aminoethylethanolamine, 19.89 g aminopropylmorpholine, and 46.83 g of glycerin.

Example 5

An accelerator composition having an AHEW=86 can be prepared by mixing 50.00 g of N-aminoethylpiperazine with 50.00 g of glycerin.

Example 6

An accelerator composition having an AHEW=144 can be prepared by mixing 30.00 g of N-aminoethylpiperazine with 70.00 g of glycerin.

Example 7

An accelerator composition having an AHEW=153 can be prepared by mixing 28.22 g of N-aminoethylpiperazine with 71.78 g of glycerin.

Example 8

An epoxy resin was made using an accelerator composition that had an AHEW value that was roughly equivalent to the AHEW value of the epoxy hardener. Curing using JEFFAMINE® T-403 amine (AHEW=81): 25.00 grams of ARALDITE® GY 6010 epoxy resin (epoxide equivalent weight or EEW=184, commercially available from Huntsman Corporation of The Woodlands, Tex.) were to be cured with 11.01 grams of JEFFAMINE® T-403 amine (AHEW=81) to obtain a 1:1 stoichiometric ratio of epoxide and amine-hydrogen groups. The polymerization took longer than the desired time, thus 1.25 grams of the JEFFAMINE® T-403 amine was replaced with 1.25 grams of a blend of N-aminoethylpiperazine (53.17 wt. %) and glycerin (46.83 wt. %) to achieve a clear, polymerized resin in a much shorter time period. The accelerator composition had an AHEW=81, thus no recalculation was necessary for the system to maintain the 1:1 stoichiometry. Similarly, to obtain a longer working time than that of the formulation containing 1.25 grams of accelerator composition, a lesser amount could be used, without calculation, by substituting it for a portion of the JEFFAMINE® T-403 amine on a weight per weight basis.

FIG. 1 shows the effect on $T_g$ of using increasing amounts of the accelerator composition of Example 1 (called ACCELERATOR™ 60) and the accelerator composition of Example 3 (called ACCELERATOR™ 81) at increasing use levels of 2, 5, and 8 phr (parts per hundred parts of epoxy resin) with an amine of the same AHEW (JEFFAMINE® D-230 amine or JEFFAMINE® T-403 amine, respectively).

When the accelerator composition of Example 2 was used at a level of 8 phr with the same epoxy resin and JEFFAMINE® D-230 amine and baked three hours at 80° C. plus two hours at 125° C., the resultant $T_g$ was 82.7° C. When the accelerator composition of Example 4 was used at a level of 8 phr with the same epoxy resin and JEFFAMINE® T-403 amine and baked three hours at 80° C. plus two hours at 125° C., the resultant $T_g$ was 80.1° C.

Figure 2:
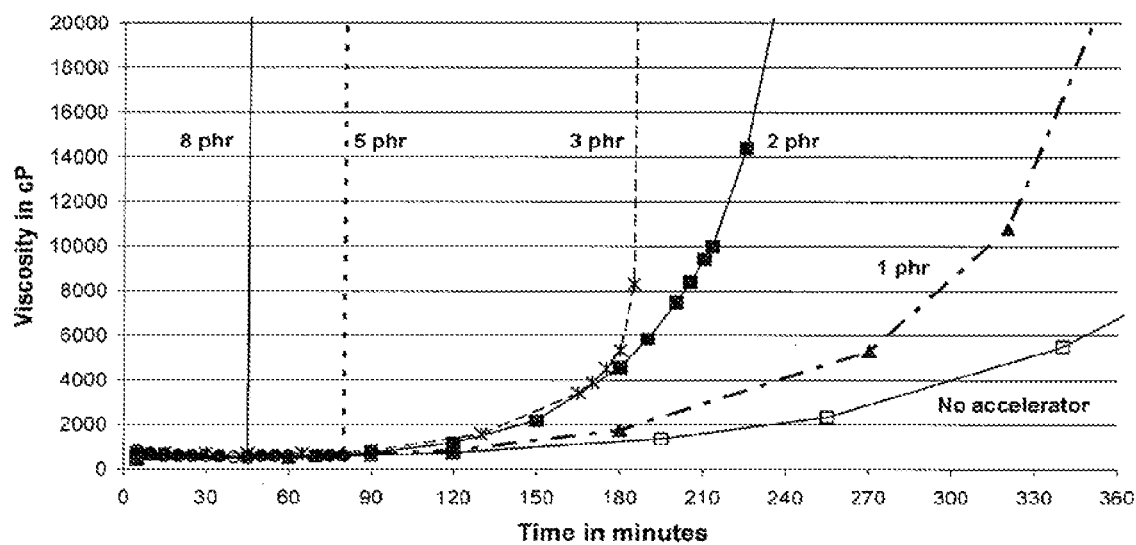
FIG. 2 displays viscosity vs. time for ACCELERATOR™ 60 with JEFFAMINE® D-230 amine and DGEBA resin (1:1 stiochiometry), at various levels of accelerator composition.
Figure 3:
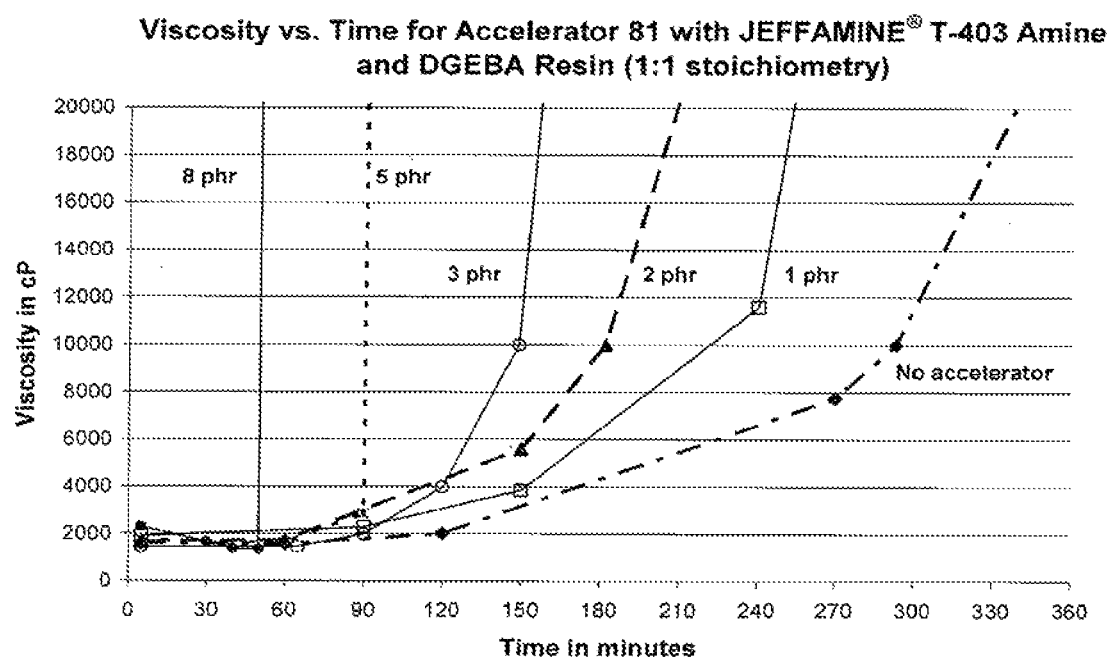
FIG. 3 displays viscosity vs. time for ACCELERATOR™ 81 with JEFFAMINE® T-403 amine and DGEBA resin (1:1 stiochiometry), at various levels of accelerator composition (ACCELERATOR is a mark used by the Huntsman Corporation of The Woodlands, Tex.).

FIGS. 2 and 3 show the effect on viscosity over time, at room temperature, of increasing levels of the accelerator compositions described in Example 1 (ACCELERATOR™ 60) or Example 3 (ACCELERATOR™ 81), when used with a epoxy hardener having a matching AHEW (either 60 or 81). If the AHEW of the accelerator compositions were not matched to that of the epoxy hardener, a calculation would need to be done for each formulation to maintain the desired one to one stoichiometry of amine hydrogen to epoxide groups. Because the AHEW of the accelerator composition and the epoxy hardener are matched, a simple weight for weight substitution may be made of accelerator composition for epoxy hardener, thus allowing quicker adjustments to be made during the process of making epoxy resins that are less prone to error.

Although the present invention and its advantages have been described in detail, it should be understood that various changes, substitutions and alterations may be made herein without departing from the spirit and scope of the invention as defined by the appended claims.

What is claimed is:

1. A method for making an epoxy resin comprising:
   a. forming an accelerator composition having an amine hydrogen equivalent weight ("AHEW") by adding an amount of glycerin to at least one amine to adjust an AHEW of the at least one amine to achieve the AHEW of the accelerator composition;
   b. selecting an epoxy hardener having an AHEW substantially similar to the AHEW of the accelerator composition; and
   c. contacting the epoxy hardener and a polyepoxy in the presence of the accelerator composition to form an epoxy resin.

2. The method of claim 1, wherein the AHEW of the accelerator composition is in the range of from about 10 to about 300 and the AHEW of the epoxy hardener is in the range of from about 10 to about 300.

3. The method of claim 1, wherein the AHEW of the accelerator composition is in the range of from about 55 to about 65.

4. The method of claim 1, wherein the AHEW of the accelerator composition is in the range of from about 75 to about 90.

5. The method of claim 1, wherein the AHEW of the accelerator composition is in the range of from about 140 to about 160.

6. The method of claim 1, wherein the at least one amine comprises a N-aminoethylpiperazine.

7. The method of claim 6, wherein the AHEW of the accelerator composition is about 60 or about 81 and the AHEW of the epoxy hardener is about 60 or about 81.

8. The method of claim 1, wherein the at least one amine comprises a piperazine.

9. The method of claim 1, wherein the at least one amine is selected from the group consisting of: an amine having a primary amine group; an amine having a secondary amine group; an amine having a tertiary amine group; an amine having a primary and secondary amine group; an amine having a primary and tertiary amine group; an amine having a secondary and tertiary amine group; an amine having a primary, secondary and tertiary amine group; and combinations thereof.

10. A method for making an epoxy resin comprising:
  a. providing an epoxy hardener, a polyepoxy, and an accelerator composition having at least one amine and a glycerin; and
  b. contacting the epoxy hardener and the polyepoxy in the presence of the accelerator composition, wherein the epoxy hardener has an amine hydrogen equivalent weight (AHEW) that matches an AHEW of the accelerator composition.

11. The method of claim 10, wherein the AHEW of the accelerator composition is in the range of from about 10 to about 300 and the AHEW of the epoxy hardener is in the range of from about 10 to about 300.

12. The method of claim 10, wherein the AHEW of the accelerator composition is in the range of from about 55 to about 65.

13. The method of claim 10, wherein the AHEW of the accelerator composition is in the range of from about 75 to about 90.

14. The method of claim 10, wherein the AHEW of the accelerator composition is in the range of from about 140 to about 160.

15. The method of claim 10, wherein the at least one amine comprises a N-aminoethylpiperazine.

16. The method of claim 15, wherein the AHEW of the accelerator composition is about 60 or about 81 and the AHEW of the epoxy hardener is about 60 or about 81.

17. The method of claim 10, further comprising adjusting a reactivity of the epoxy resin formulation by exchanging the accelerator composition with the epoxy hardener on a weight for weight basis.

18. The method of claim 10, wherein the at least one amine and the glycerin are mixed to form the accelerator composition prior to mixing with the epoxy hardener and the polyepoxy.

19. The method of claim 1, wherein the AHEW of the epoxy hardener matches the AHEW of the accelerator composition.

20. The method of claim 1, wherein the AHEW of the at least one amine is different from the AHEW of the epoxy hardener.

* * * * *